United States Patent [19]
Levins

[11] Patent Number: 5,971,165
[45] Date of Patent: Oct. 26, 1999

[54] PUZZLE BOOK RACK

[75] Inventor: Michael Levins, Westport, Conn.

[73] Assignee: Innovative USA, Inc., Stamford, Conn.

[21] Appl. No.: 09/102,434

[22] Filed: Jun. 22, 1998

[51] Int. Cl.[6] ................................................ A47B 65/00
[52] U.S. Cl. .................................................... 211/43
[58] Field of Search ............................... 211/43, 42, 109

[56] References Cited

U.S. PATENT DOCUMENTS

| | | | |
|---|---|---|---|
| 3,814,474 | 6/1974 | Baker et al. | 297/160 |
| 4,099,624 | 7/1978 | McKearin | 211/42 |
| 4,569,447 | 2/1986 | Cifranic | 211/42 |
| 4,595,105 | 6/1986 | Gold | 211/43 |
| 4,759,449 | 7/1988 | Gold | 211/43 |
| 5,205,420 | 4/1993 | Petryszak | 211/43 |
| 5,447,242 | 9/1995 | Kelly et al. | 211/42 |
| 5,472,098 | 12/1995 | Ho | 211/2 |
| 5,653,471 | 8/1997 | Koehn | 281/16 |
| 5,683,112 | 11/1997 | McQueeny | 281/29 |

*Primary Examiner*—Alvin Chin-Shue
*Assistant Examiner*—Sarah Purol
*Attorney, Agent, or Firm*—Hedman, Gibson & Costigan, P.C.

[57] ABSTRACT

The present invention provides a book rack formed from interlocking puzzle pieces.

20 Claims, 4 Drawing Sheets

PUZZLE BOOK RACK

FIELD OF THE INVENTION

The present invention relates to a book rack. More particularly the present invention relates to a book rack formed from puzzle pieces. Most particularly the present invention relates to a book rack formed of puzzle pieces which can also form a flat puzzle.

BACKGROUND OF THE INVENTION

Devices for holding books are well known in the art. For example, devices have been patented for providing a bookrack which is detachable from a chair in Baker et al., U.S. Pat. No. 3,814,474. Other book racks have been developed for providing tall displays of books, such as in Kelly et al., U.S. Pat. No. 5,447,242. Book racks have also been disclosed which are portable and/or adjustable. See for example, Petryszak, U.S. Pat. No. 5,205,420 and McKearin, U.S. Pat. No. 4,099,624. Gold discloses bookracks formed from standard interlocking pieces in U.S. Pat. Nos. 4,595,105 and 4,759,449.

There have also been disclosures in which books have employed puzzles in association with the book. See for example, McQueeny, U.S. Pat. No. 5,683,112 and Koehn, U.S. Pat. No. 5,653,471.

However, none of the prior art references teach or suggest that a book rack could be formed from puzzle pieces. A bookrack which is formed from puzzle pieces would have significant advantages over those of the prior art. Specifically, a book rack made from puzzle pieces would be a useful educational tool for children learning spatial relationships of objects. Additionally, the puzzle pieces would add fun to the construction of a bookrack. Further, the puzzle pieces could be made of varying complexity to add to the challenge of puzzle construction, or the pieces could be made interchangeable to assist in fostering imaginative skills, or the pieces could also be designed to form a floor puzzle when not in a book rack configuration.

SUMMARY OF THE PRESENT INVENTION

To this end the present inventor has provided a book rack constructed of interlocking puzzle pieces.

In one preferred embodiment the puzzle book rack comprises: (a) a left end interlocking puzzle piece having interlocking means on its back edge and bottom edge; (b) a right end interlocking puzzle piece having interlocking means on its back edge and bottom edge; (c) a back interlocking puzzle piece having interlocking means adapted for interlocking with the back edge interlocking means of the left end interlocking puzzle piece and interlocking means adapted for interlocking with the back edge of the right end interlocking puzzle piece, and interlocking means on its bottom edge for interlocking with a bottom interlocking puzzle piece; and (d) a bottom interlocking puzzle piece having interlocking means adapted for interlocking with the bottom edge interlocking means of the left end interlocking puzzle piece, interlocking means adapted for interlocking with the bottom edge of the right end interlocking puzzle piece, and interlocking means adapted for interlocking with the bottom edge of the back interlocking puzzle piece.

In a further preferred embodiment the present invention provides a puzzle book rack comprising: (a) a left end interlocking puzzle piece having interlocking means on its back edge and bottom edge; (b) a right end interlocking puzzle piece having interlocking means on its back edge and bottom edge; (c) a back left interlocking puzzle piece having interlocking means on its left side adapted for interlocking with the back edge interlocking means of said left end interlocking puzzle piece, interlocking means on its bottom edge, and interlocking means on its right side; (d) a back right interlocking puzzle piece having interlocking means adapted for interlocking with the back edge of said right end interlocking puzzle piece, interlocking means on its bottom edge, and interlocking means on its left side; (e) a bottom left interlocking puzzle piece having interlocking means adapted for interlocking with the bottom edge interlocking means of said left end interlocking puzzle piece, interlocking means on its back edge adapted for interlocking with the bottom edge interlocking means of the back left interlocking puzzle piece, and interlocking means on its right side; (f) a bottom right interlocking means adapted for interlocking with the bottom edge of said right end interlocking puzzle piece, interlocking means on its back edge adapted for interlocking with the bottom edge interlocking means of the back right interlocking puzzle piece, and interlocking means on its left side; (g) x number of interlocking back extensor puzzle pieces having interlocking means on its left edge, bottom edge and right edge; and (h) y number of bottom extensor interlocking puzzle pieces having interlocking means on its left edge, back edge and right edge; wherein x is 0 or greater and x=y.

In further preferred embodiments on or more of the interlocking puzzle pieces may be interchangeable, and/or may decorated, such that the puzzle pieces form a picture related to the books contained in the book rack when the puzzle pieces are interlocked together in the correct order in the form of a book rack and/or in the form of a floor puzzle.

DETAILED DESCRIPTION OF THE PRESENT INVENTION

The following description of preferred embodiments of the present invention is provided for illustrative purposes only and is not to be construed to limit the scope of the appended claims.

Figure 1:
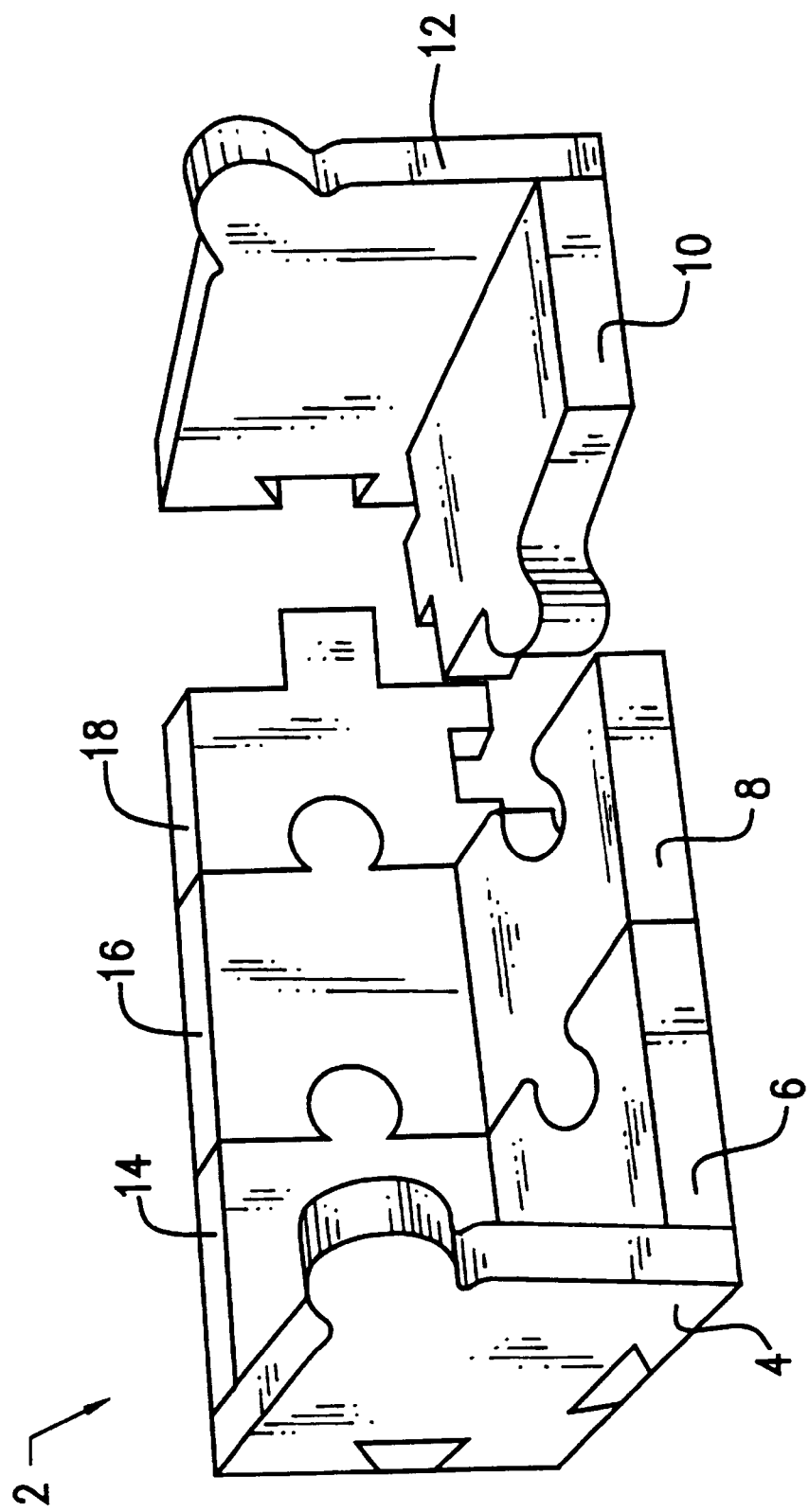
FIG. 1 depicts an embodiment of the present invention showing how the puzzle pieces fit together.
Figure 2:
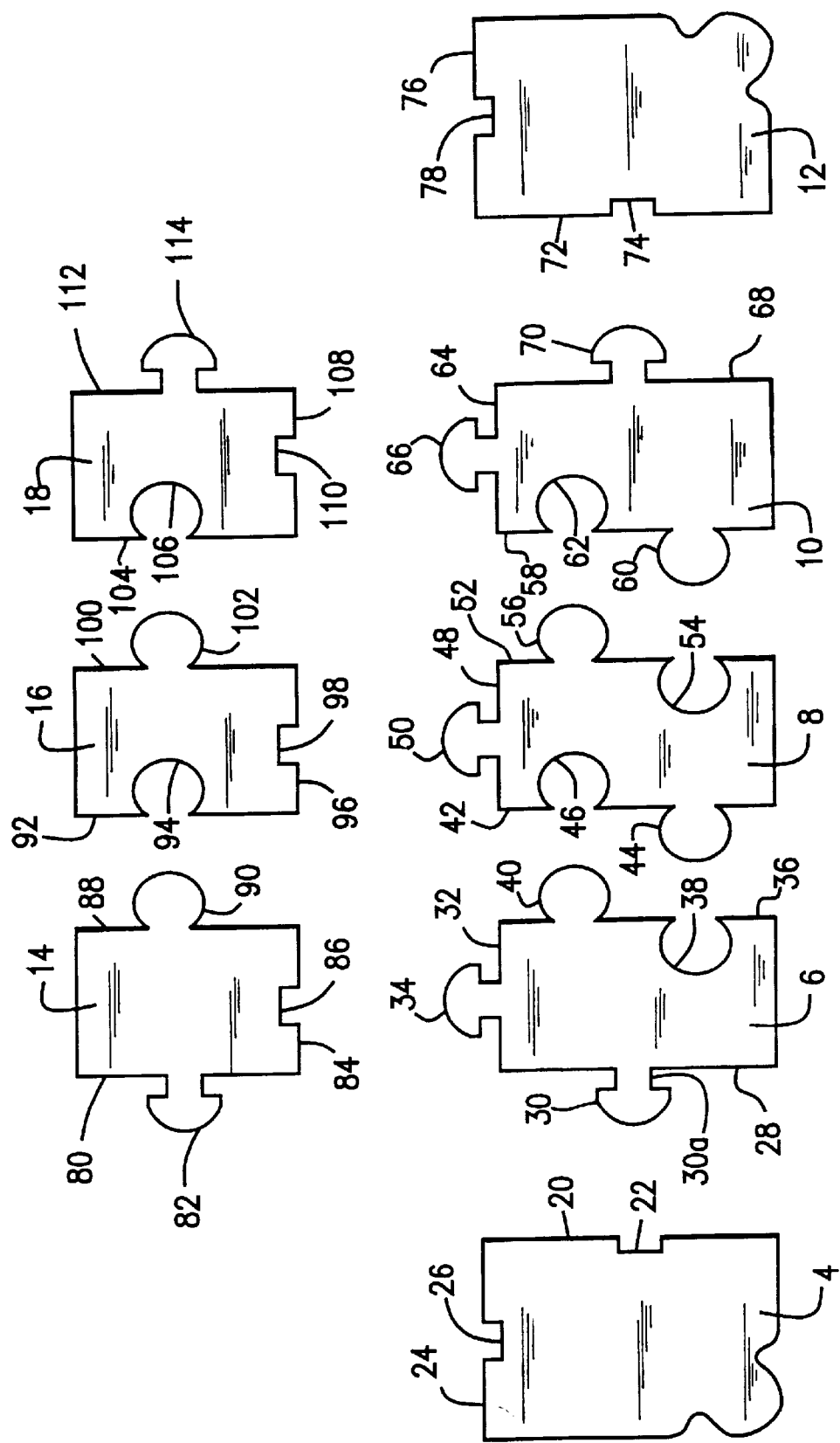
FIG. 2 depicts an embodiment of the present invention where the puzzle pieces have not been put together.

Referring to FIGS. 1 and 2, the present invention comprises a bookrack 2 which is formed from a number of interlocking puzzle pieces 4, 6, 8, 10, 12, 14, 16 and 18, respectively.

The left end piece 4 has a bottom side edge 20 provided with an interlocking means 22 and a back side edge 24 having an interlocking means 26. The left bottom piece 6 has a left side edge 28 having an interlocking means 30 suitable for interlocking with interlocking means 22 at a right angle, a back side edge 32 having interlocking means 34 and a right side edge 36 having two interlocking means 38 and 40. Bottom extensor piece 8 has a left side edge 42 having two interlocking means 44 and 46 adapted for interlocking with interlocking means 38 and 40, respectively, a back side edge 48 having interlocking means 50 and a right side edge 52 having interlocking means 54 and 56. The right bottom piece 10 has a left side edge 58 having two interlocking means 60 and 62 adapted for interlocking with interlocking means 54 and 56, a back side edge 64 having interlocking means 66 and a right side edge 68 having interlocking means 70. The right end piece 12 has a bottom side edge 72 having an interlocking means 74 suitable for interlocking with interlocking means 70 at a right angle and a back side edge 76 having interlocking means 78.

The left back piece 14 has a left side edge 80 having interlocking means 82 suitable for interlocking with interlocking means 26 at a right angle, bottom side edge 84 having an interlocking means 86 adapted for interlocking with interlocking means 34 at a right angle, and a right side edge 88 having an interlocking means 90. The back extensor piece 16 has a left side edge 92 having interlocking means 94 suitable for interlocking with interlocking means 90, a bottom side edge 96 having interlocking means 98 suitable for interlocking with interlocking means 50 at a right angle, and a right side edge 100 having interlocking means 102. The right back piece 16 has a left side edge 104 having interlocking means 106 suitable for interlocking with interlocking means 102, a bottom side edge 108 having interlocking means 110 suitable for interlocking with interlocking means 66 at a right angle, and a right side edge 112 having interlocking means 114 suitable for interlocking with interlocking means 78 at a right angle.

The interlocking means are of two types dovetails and mortises. The cooperating pairs of interlocking means comprise one dovetail and one mortise. Thus, as best seen in FIG. 2, interlocking means 22, 26, 38, 46, 54, 62, 74, 78, 86, 94, 98, 106 and 110 are dovetails; and correspondingly, interlocking means 30, 34, 40, 44, 50, 56, 60, 66, 70, 82, 90, 102 and 114 are mortises. The dovetails and mortises can take on a variety of shapes as is well known to those skilled in the art as long as they lock together. Additionally, the sides of the puzzle pieces can have one or more interlocking means, depending on the size of the overall bookrack.

On the right angle interlocking joints, it can be seen from FIG. 2 that the mortises have necks which fit into the corresponding dovetails. See for example interlocking means 30 with neck 30a. This feature facilitates the joining of the pieces at right angles.

In preferred embodiments, the interlocking pieces fit together with sufficient friction in the interlocking means such that the bookrack structure will support the books contained therein. It is further contemplated in other embodiments that one could employ a velcro or other similar fastener on the interlocking means to provide additional strength.

The interlocking pieces can be formed of any of a variety of materials which have sufficient flexibility to fit together in a puzzle like interlocking fashion. A preferred material of construction is an EVA (ethyl vinyl acetate) foam, although other foam rubber type materials, even cardboard or wood could be employed.

The thickness and size of the interlocking pieces can vary as desired to provide good structural support and depending on the types of books which are contemplated to be contained within the structure. In a preferred embodiment the pieces are from about 2 to about 10 inches in width, from about 2 to about 10 inches in height and from about ¼ to about 2 inches in thickness.

Figure 3:
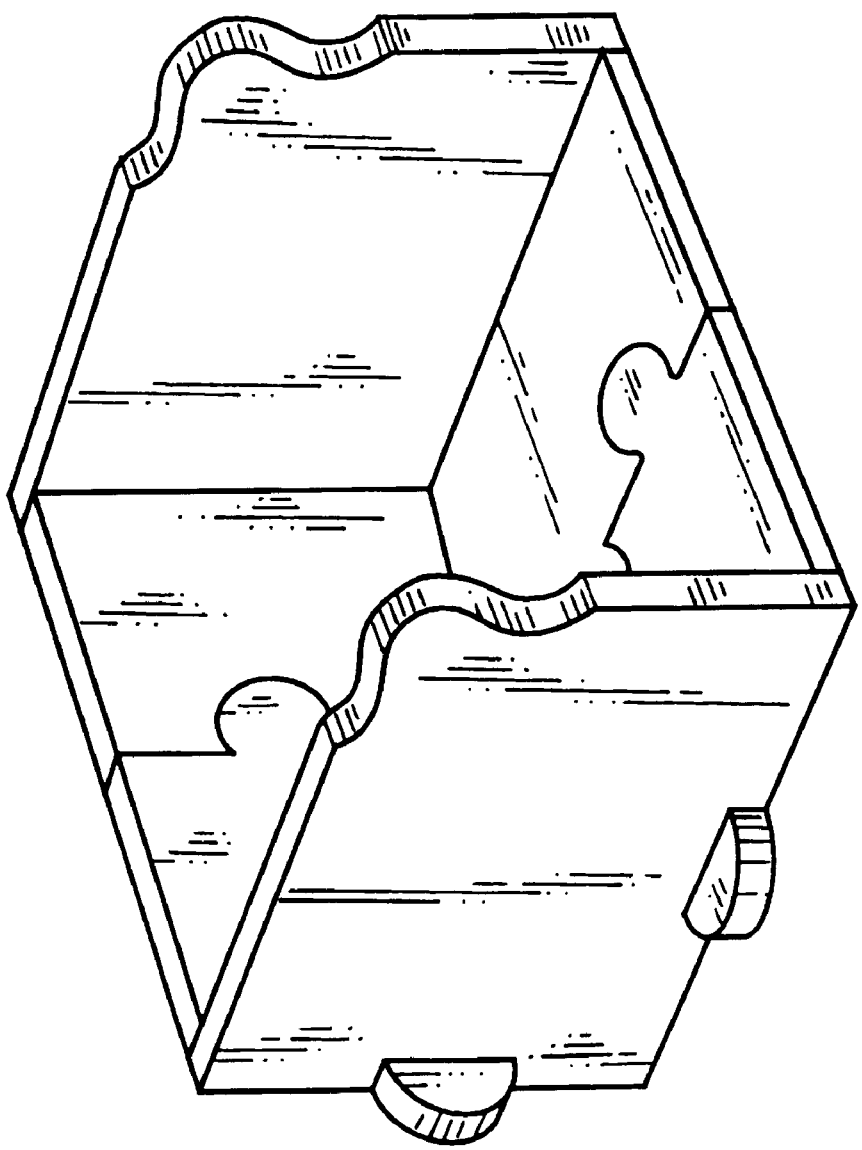
FIG. 3 depicts another embodiment of the present invention.

It is further contemplated herein that the bookrack of the present invention is expandable or shortenable. For example, more than one bottom extensor piece may be employed, and correspondingly, more than one back extensor piece may be employed, or the extensor pieces may be left out altogether (see FIG. 3). Thus, it is contemplated that there are x bottom extensor pieces and y back extensor pieces where x ranges from 0 to about 20, preferably from about 1 to about 10, more preferably from about 1 to about 4 and most preferably from about 1 to about 3, and where x=y.

Figure 4:
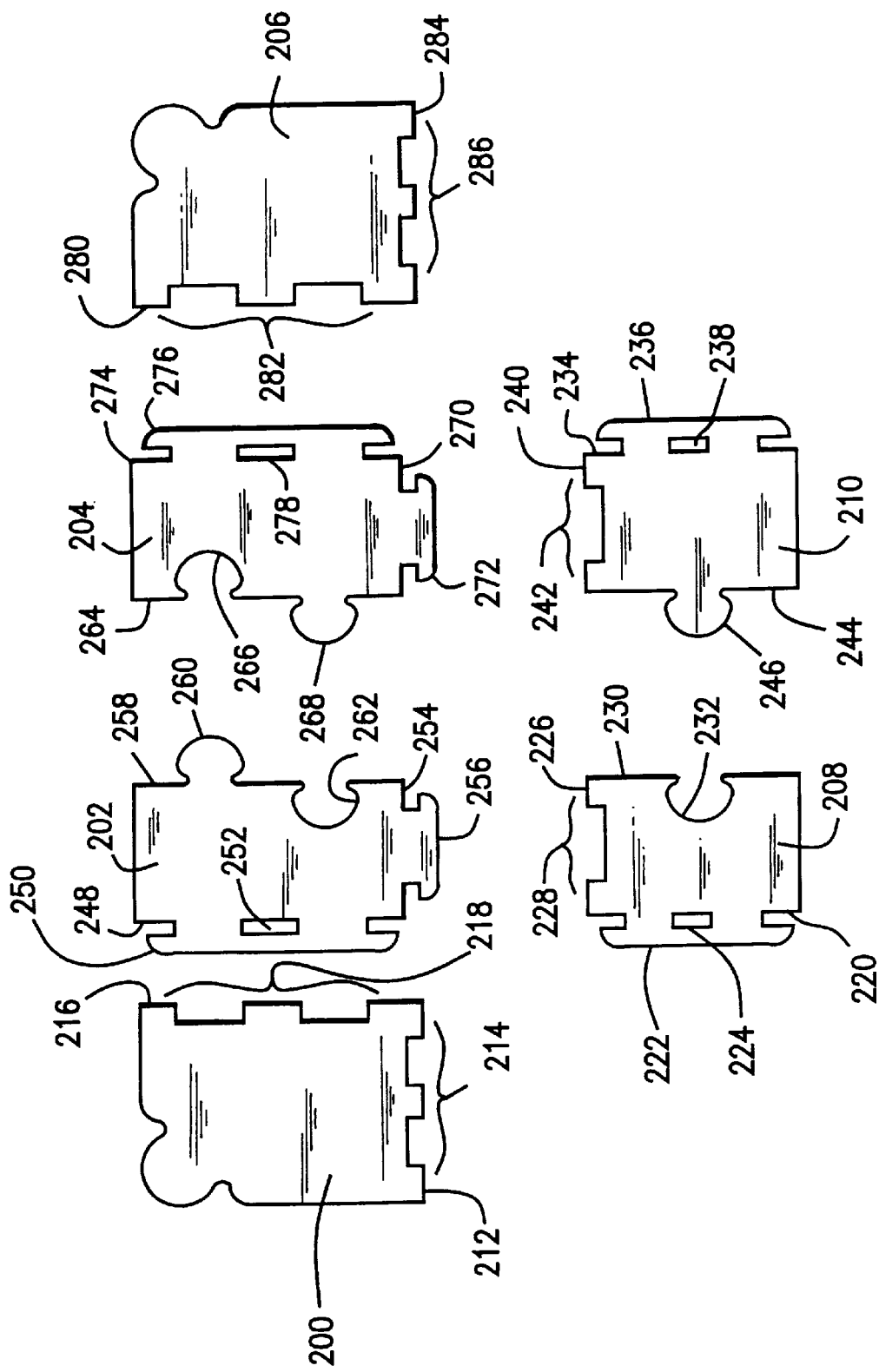
FIG. 4 depicts still another preferred embodiment of the present invention.

FIG. 4 represents a still further preferred embodiment showing additional types of mortises and dovetails which may be employed in the practice of the present invention. In FIG. 4 there is provide a left corner piece 200, a left back piece 202, a right back piece 204, a right corner piece 206, a left bottom piece 208 and a right bottom piece 210.

The left corner piece 200 has a bottom side edge 212 provided with a battlement shaped interlocking means 214 having two crenels and three merlons and a back side edge 216 provided with a battlement shaped interlocking means 218 having two crenels and three merlons.

The left bottom piece 208 has a left side edge 220 having an interlocking means 222 suitable for interlocking with interlocking means 214 of left corner piece 200 at a right angle. In this regard, interlocking means 222 is tab shaped such that the outer two merlons of interlocking means 214 fit between the bottom edge of tab interlocking means 222 and the left side edge 220 and the middle merlon of interlocking means 214 fits into hole 224 provided in the center of tab interlocking means 222. The back side edge 226 of left bottom piece 208 is provided with battlement shaped interlocking means 228 having two outer merlons and one middle crenel. The right side edge 230 of left bottom piece 208 is provided with a dovetail interlocking means 232.

The right bottom piece 210 has a right side edge 234 having a tab shaped interlocking means 236 provided with a hole 238 in the center of tab interlocking means 236. The back side edge 240 of right bottom piece 210 is provided with battlement shaped interlocking means 242 having two outer merlons and one middle crenel. The left side edge 244 of right bottom piece 210 is provided with a mortise interlocking means 246 suitable for interlocking with dovetail 232 of left bottom piece 208.

The left back piece 202 has a left side edge 248 having an interlocking means 250 suitable for interlocking with interlocking means 218 of left corner piece 200 at a right angle. In this regard, interlocking means 250 is tab shaped such that the outer two merlons of interlocking means 218 fit between the bottom edge of tab interlocking means 250 and left side edge 248 of the left back piece 202 and the middle merlon of interlocking means 218 fits into hole 252 provided in the center of tab interlocking means 250. The bottom side edge 254 of left back piece 202 is provided with a tab shaped interlocking means 256 adapted for interlocking with interlocking means 228 of left bottom piece 208 at a right angle. The interlocking means 256 is tab shaped such that the outer two merlons of interlocking means 228 fit between the bottom edge of tab interlocking means 256 and the bottom side edge 254 of left back piece 202, and the middle merlon of interlocking means 228 fits around the neck of tab 256. The right side edge 258 of left back piece 202 is provided with a dovetail interlocking means 262 and a mortise interlocking means 260.

The right back piece 204 has a left side edge 264 having a dovetail interlocking means 266 suitable for interlocking with mortise interlocking means 260 of left back piece 202 and a mortise interlocking means 268 suitable for interlocking with dovetail interlocking means 262 of left back piece 202. The bottom side edge 270 of right back piece 204 is provided with a tab shaped interlocking means 272 adapted for interlocking with interlocking means 242 of right bottom piece 210 at a right angle. The interlocking means 272 is tab shaped such that the outer two merlons of interlocking means 242 fit between the bottom edge of tab interlocking means 272 and the bottom side edge 270 of right back piece 204, and the middle merlon of interlocking means 242 fits around the neck of tab 272. The right side edge 274 of right back piece 204 is provided with a tab shaped interlocking means 276 equipped with a hole 278 in the center thereof.

Right corner piece 206 has a back side edge 280 provided with a battlement shaped interlocking means 282 having two crenels and three merlons suitable for interlocking with tab interlocking means 276 of right back piece 204 at a right angle. In this regard, the outer two merlons of interlocking means 282 fit between the bottom edge of tab interlocking means 276 and right side edge 274 of right back piece 204 and the middle merlon of interlocking means 282 fits into hole 278 provided in the center of tab interlocking means 276. The right corner piece 206 also has a bottom side edge 284 provided with a battlement shaped interlocking means 286 having two crenels and three merlons suitable for interlocking at a right angle with the interlocking means 236 of right bottom piece 210. In this regard the outer two merlons of interlocking means 286 fit between the bottom edge of tab interlocking means 236 and right side edge 234 of right bottom piece 210 and the middle merlon of interlocking means 286 fits into hole 238 provided in the center of tab interlocking means 236.

Thus, one skilled in the art will appreciate that the pieces depicted in FIG. 4 can fit together to form a puzzle book rack in accordance with the present invention. The use of the battlement shaped and tab shaped interlocking means on the exterior connections of the puzzle book rack provide for a smooth exterior appearance of the puzzle book rack upon assembly. Thus the employment of merlons having a depth and the crenels having a height equal to the thickness of the puzzle pieces is also preferred. It is further contemplated that additional extensor pieces could also be included in the embodiment of FIG. 4 to extend the length of the puzzle book rack and make a more challenging puzzle.

The present invention further contemplates that the puzzle pieces be decorated, on one or both sides, such as with different colors or different characters. In such an embodiment, the use of pieces which are interchangeable, i.e., can fit together in a variety of ways, is preferable. Alternatively, the puzzle pieces may be decorate, again on one or both sides, such that they cooperate to form a picture. In an especially preferred embodiment, the picture formed by the puzzle pieces relates to the theme of a set of books to be contained therein. In this manner, for example, a set of books by Beatrix Potter could be sold together with a puzzle bookrack of the present invention where the puzzle pieces have decorations of a scene or characters from the Beatrix Potter books. In still another preferred embodiment, the pieces are designed such that they can be reassembled as a floor puzzle in addition to their assembly as a book rack.

All of the above-referenced patents are hereby incorporated by reference.

Many variations of the present invention will suggest themselves to those skilled in the art in light of the above-detailed description. All such obvious variations are within the full intended scope of the appended claims.

I claim:

1. A puzzle book rack comprising:
   (a) a left end interlocking puzzle piece having a back edge interlocking means and a bottom edge interlocking means;
   (b) a right end interlocking puzzle piece having a back edge interlocking means and a bottom edge interlocking means;
   (c) a back interlocking puzzle piece having, interlocking means adapted for interlocking with said back edge interlocking means of said left end interlocking puzzle piece, interlocking means adapted for interlocking with said back edge interlocking means of said right end interlocking puzzle piece, and further having a bottom edge interlocking means for interlocking with a bottom interlocking puzzle piece; and
   (d) a bottom interlocking puzzle piece having interlocking means adapted for interlocking with said bottom edge interlocking means of said left end interlocking puzzle piece, interlocking means adapted for interlocking with the said bottom edge interlocking means of said right end interlocking puzzle piece, and interlocking means adapted for interlocking with the bottom edge interlocking means of said back interlocking puzzle piece.

2. A puzzle book rack as defined in claim 1 wherein said interlocking puzzle pieces fit together to support a number of books by friction between the puzzle piece interlocking means alone.

3. A puzzle book rack as defined in claim 1 wherein said interlocking puzzle pieces are decorated.

4. A puzzle book rack as defined in claim 3 wherein the decorated puzzle pieces form a picture when interlocked together.

5. A puzzle book rack as defined in claim 4 wherein said picture relates to a theme of the books to be held on the bookrack.

6. A puzzle book rack as defined in claim 1 wherein said left end piece and said right end piece are interchangeable.

7. A puzzle book rack as defined in claim 1 wherein said back piece and said bottom piece are interchangeable.

8. A puzzle book rack comprising:
   (a) a left end interlocking puzzle piece having a back edge interlocking means and a bottom edge interlocking means;
   (b) a right end interlocking puzzle piece having a back edge interlocking means and a bottom edge interlocking means;
   (c) a back left interlocking puzzle piece having a left side interlocking means adapted for interlocking with said back edge interlocking means of said left end interlocking puzzle piece, a bottom edge interlocking means, and a right side interlocking means;
   (d) a back right interlocking puzzle piece having interlocking means adapted for interlocking with said back edge interlocking means of said right end interlocking puzzle piece, a bottom edge interlocking means and left side interlocking means;
   (e) a bottom left interlocking puzzle piece having interlocking means adapted for interlocking with bottom edge interlocking means of said left end interlocking puzzle piece, a back edge interlocking means adapted for interlocking with said bottom edge interlocking means of the back left interlocking puzzle piece, and a right side interlocking means;
   (f) a bottom right interlocking puzzle piece having interlocking means adapted for interlocking with said bottom edge interlocking means of said right end interlocking puzzle piece, a back edge interlocking means adapted for interlocking with said bottom edge interlocking means of the back right interlocking puzzle piece, and a left side interlocking means;

(g) x number of interlocking back extensor puzzle pieces, each said interlocking back extensor puzzle piece having left edge interlocking means, bottom edge interlocking means and right edge interlocking means; and (h) y number of bottom extensor interlocking puzzle pieces, each said bottom extensor interlocking puzzle piece having left edge interlocking means, back edge interlocking means and right edge interlocking means; wherein X is 0 or greater and x=y.

9. A puzzle book rack as defined in claim 8 wherein x ranges from 1 to about 5.

10. A puzzle book rack as defined in claim 9 wherein x ranges from 1 to about 3.

11. A puzzle book rack as defined in claim 8 wherein said interlocking puzzle pieces fit together to support a number of books by friction between the puzzle piece interlocking means alone.

12. A puzzle book rack as defined in claim 8 wherein said interlocking puzzle pieces are decorated.

13. A puzzle book rack as defined in claim 9 wherein the decorated puzzle pieces form a picture when interlocked together.

14. A puzzle book rack as defined in claim 13 wherein said picture relates to a theme of the books to be held on the bookrack.

15. A puzzle book rack as defined in claim 8 wherein said left end piece and said right end piece are interchangeable.

16. A puzzle book rack as defined in claim 8 wherein said interlocking puzzle pieces are comprised of ethyl vinyl acetate foam.

17. A puzzle book rack as defined in claim 8 wherein x=0.

18. A puzzle book rack as defined in claim 17 wherein the back edge interlocking means of said left end interlocking puzzle piece has a battlement shape, the bottom edge interlocking means of said left end interlocking puzzle piece has a battlement shape, the back edge interlocking means of said right end interlocking puzzle piece has a battlement shape, the bottom edge interlocking means of said right end interlocking puzzle piece has a battlement shape, the left side interlocking means of the back left interlocking puzzle piece has a tab shape, the bottom edge interlocking means of the back left interlocking puzzle piece has a tab shape, the right side interlocking means of the back left interlocking puzzle piece comprises a mortise and a dovetail, the left side interlocking means of the back right interlocking puzzle piece comprises a dovetail and a mortise, the bottom side interlocking means of the back right interlocking puzzle piece has a tab shape, the right side interlocking means of the back right interlocking puzzle piece has a tab shape, the left side interlocking means of the bottom left interlocking puzzle piece has a tab shape, the back side interlocking means of the bottom left interlocking puzzle piece has a battlement shape, the right side interlocking means of the bottom left interlocking puzzle piece comprises a dovetail, the left side interlocking means of the bottom right interlocking puzzle piece comprise a mortise, the back side interlocking means of the bottom right interlocking puzzle piece has a battlement shape and the right side interlocking means of the bottom right interlocking puzzle piece has a tab shape.

19. A puzzle book rack as defined in claim 1 wherein said interlocking puzzle pieces further fit together to form a floor puzzle.

20. A puzzle book rack as defined in claim 8 wherein said interlocking puzzle pieces further fit together to form a floor puzzle.

\* \* \* \* \*